United States Patent
Kishi et al.

(10) Patent No.: US 9,200,719 B2
(45) Date of Patent: Dec. 1, 2015

(54) FLUID CONTROL VALVE DEVICE

(71) Applicant: DENSO CORPORATION, Kariya, Aichi-pref. (JP)

(72) Inventors: Ryoyu Kishi, Obu (JP); Yuichiro Miura, Obu (JP); Hirofumi Onodera, Kariya (JP)

(73) Assignee: DENSO CORPORATION, Kariya (JP)

( * ) Notice: Subject to any disclaimer, the term of this patent is extended or adjusted under 35 U.S.C. 154(b) by 59 days.

(21) Appl. No.: 14/299,403

(22) Filed: Jun. 9, 2014

(65) Prior Publication Data

US 2015/0027571 A1   Jan. 29, 2015

(30) Foreign Application Priority Data

Jul. 25, 2013  (JP) .................................. 2013-154659

(51) Int. Cl.
*F16K 15/18* (2006.01)
*F16K 31/02* (2006.01)
*B60K 15/035* (2006.01)

(52) U.S. Cl.
CPC ................ *F16K 31/02* (2013.01); *F16K 15/18* (2013.01); *B60K 15/03519* (2013.01); *Y10T 137/88054* (2015.04)

(58) Field of Classification Search
CPC ................ B60K 15/03519; Y10T 137/86324
USPC ................ 137/513.7, 587; 123/519; 251/121
See application file for complete search history.

(56) References Cited

U.S. PATENT DOCUMENTS

| | | | | |
|---|---|---|---|---|
| 5,605,177 | A | * | 2/1997 | Ohashi ............. B60K 15/03519 123/516 |
| 6,511,042 | B1 | | 1/2003 | Schulz |
| 7,069,946 | B2 | * | 7/2006 | Clare, Jr. ................ F16K 15/044 137/513.7 |
| 7,107,971 | B2 | * | 9/2006 | Spink ............... B60K 15/03519 123/518 |
| 2010/0269921 | A1 | * | 10/2010 | Pifer ................. B60K 15/03519 137/487.5 |
| 2012/0255639 | A1 | | 10/2012 | Onodera et al. |

FOREIGN PATENT DOCUMENTS

JP   H07-310849 A   11/1995
JP   2012-219868 A   11/2012

OTHER PUBLICATIONS

Office Action issued Jun. 11, 2015 in corresponding JP Application No. 2013-154659.

* cited by examiner

*Primary Examiner* — John Fox (57) ABSTRACT

A first hole is connected through a first fluid chamber to an inflow hole. A first valve seat is formed around the first hole. A second fluid chamber is connected through a second hole to the first hole. An outflow hole is connected to the second fluid chamber. A second valve seat is formed around the second hole. A third valve seat is formed around the outflow hole. A first valve element is movable in the first fluid chamber to make contact with the first valve seat. A second valve element is movable in the second fluid chamber to make contact with the second valve seat or the third valve seat. A biasing member biases the second valve element toward the second valve seat. An outer peripheral passage is formed between an outer periphery of the second valve element and the second housing to enable flow therethrough.

5 Claims, 11 Drawing Sheets

FLUID CONTROL VALVE DEVICE

CROSS REFERENCE TO RELATED APPLICATION

This application is based on reference Japanese Patent Application No. 2013-154659 filed on Jul. 25, 2013, the disclosure of which is incorporated herein by reference.

TECHNICAL FIELD

The present disclosure relates to a fluid control valve device for controlling flow of fluid.

BACKGROUND

Conventionally, a known fluid control valve device employs two valve elements. For example, a fluid control valve device disclosed in Patent Document 1 employs a first valve element driven by a solenoid actuator. The fluid control valve device of Patent Document 1 further employs a second valve element biased onto a valve seat portion with a biasing member, which is equipped to the first valve element. The second valve element is lifted from the valve seat portion to open when the first valve element is lifted to open by a predetermined quantity or more.

PATENT DOCUMENT 1

Publication of unexamined Japanese patent application No. 2012-219868

In the fluid control valve device of Patent Document 1, in a case where a biasing force of the biasing member, which biases the second valve element toward the valve seat portion side, is modified, design modification of the solenoid actuator is also needed. Specifically, for example, in a case where the biasing force of the biasing member is increased, a biasing force of a biasing member in the solenoid actuator also needs to be increased to further bias the first valve element toward the valve seat portion. Therefore, such design modification requires modification of a magnetic circuit of the solenoid actuator to increase an electric power supplied to the solenoid actuator. As described above, the fluid control valve device of Patent Document 1 may need to modify the two valve elements including the first valve element and the second valve element simultaneously. Therefore, the conventional configuration may cause a burden when variations are made.

In addition, the fluid control valve device of Patent Document 1 has a space accommodating the first valve element and the second valve element. When the fluid control valve device is in operation, the space is in communication with the fuel tank. Therefore, the second valve element is regularly exposed to vapor fuel. Consequently, the second valve element may be subject to various influences from fuel, such as adhesion of adhesive substance, extraction, swelling, and deterioration. In a case where adhesive substance in fuel adheres onto the second valve element and the valve seat portion and solidifies between the second valve element and the valve seat portion, the second valve element may stick onto the valve seat portion. Consequently, the second valve element may cause a malfunction. In addition, in the fluid control valve device of Patent Document 1, when the second valve element opens the valve seat portion and closes the valve seat portion, the second valve element and the valve seat portion may cause a noise therebetween. The noise may be transmitted to the fuel tank, and consequently, the transmitted noise may cause resonance in the fuel tank.

SUMMARY

It is an object of the present disclosure to produce a fluid control valve device including two valve elements, the fluid control valve device configured to facilitate design modification of two valve elements.

According to an aspect of the present disclosure, a fluid control valve device comprises a first housing having an inflow hole configured to enable inflow of fluid, a first fluid chamber connected to the inflow hole, a first hole connected to the first fluid chamber, and a first valve seat portion formed around an outer periphery of the first hole. The fluid control valve device further comprises a second housing having a second hole connected to the first hole, a second fluid chamber connected to the second hole, an outflow hole connected to the second fluid chamber and configured to enable outflow of fluid, a second valve seat portion formed around an outer periphery of the second hole, and a third valve seat portion formed around an outer periphery of the outflow hole. The fluid control valve device further comprises a first valve element axially movable in the first fluid chamber and configured to make contact with the first valve seat portion at an outer periphery. The fluid control valve device further comprises an actuator configured to move the first valve element. The fluid control valve device further comprises a second valve element axially movable in the second fluid chamber between the second valve seat portion and the third valve seat portion. The second valve element is configured to make contact with the second valve seat portion or the third valve seat portion at an outer periphery. The fluid control valve device further comprises a biasing member configured to bias the second valve element in a direction in which the second valve element makes contact with the second valve seat portion. The fluid control valve device further comprises an outer peripheral passage formed between an outer periphery of the second valve element and the second housing to enable flow of fluid between a space formed with the second valve element on a side of the second hole and a space formed with the second valve element on a side of the outflow hole.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, a fluid control valve device according to multiple embodiments of the present disclosure will be described with reference to drawings. In the multiple embodiments, the same reference numeral will be denoted to substantially corresponding elements, and description thereof will be omitted. In order to avoid complexity in drawings, a single reference numeral may be denoted on one of elements, which are substantially identical to each other.

First Embodiment

Figure 1:
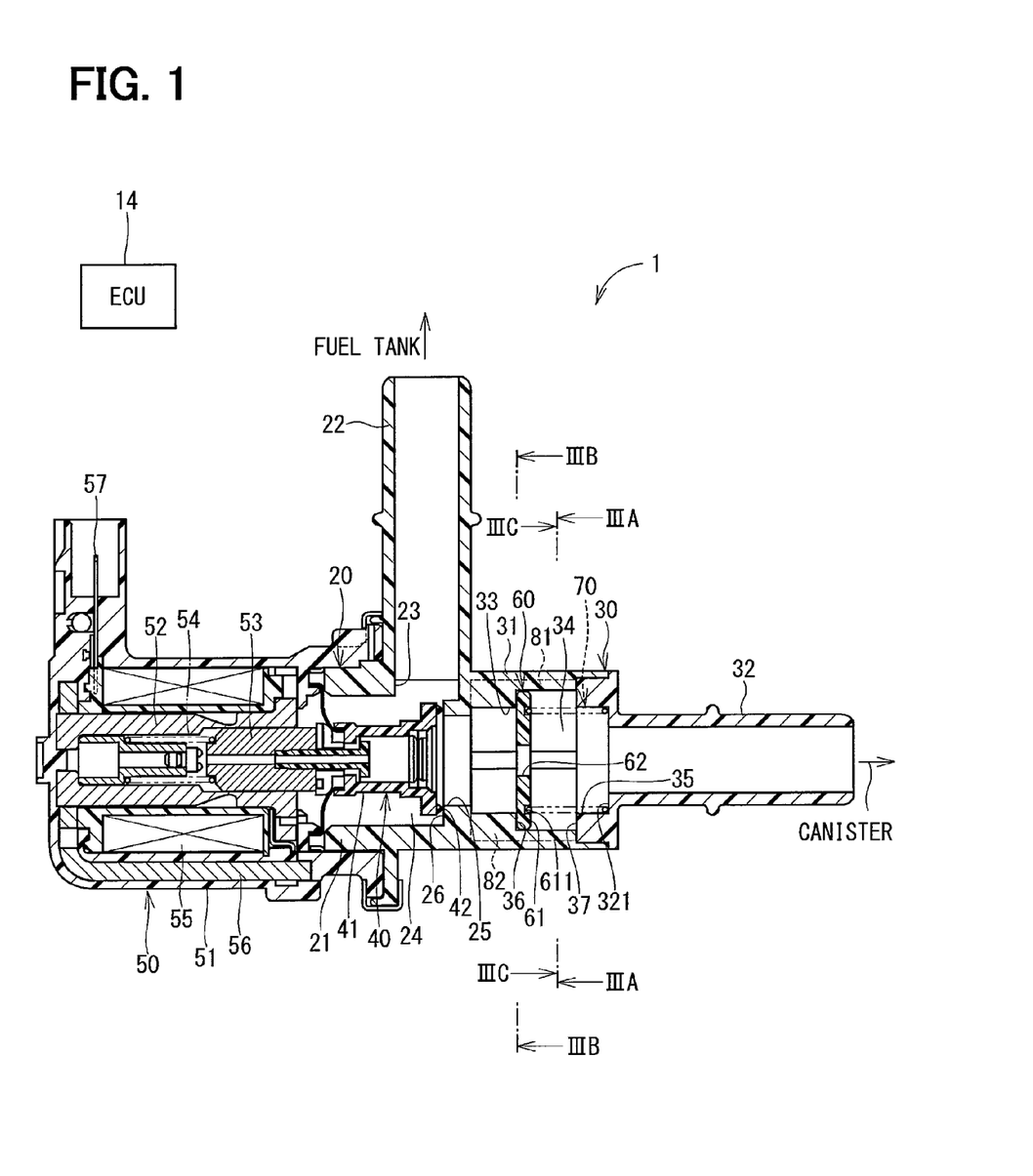
FIG. 1 is a sectional view showing a fluid control valve device according to a first embodiment of the present disclosure.
Figure 2:
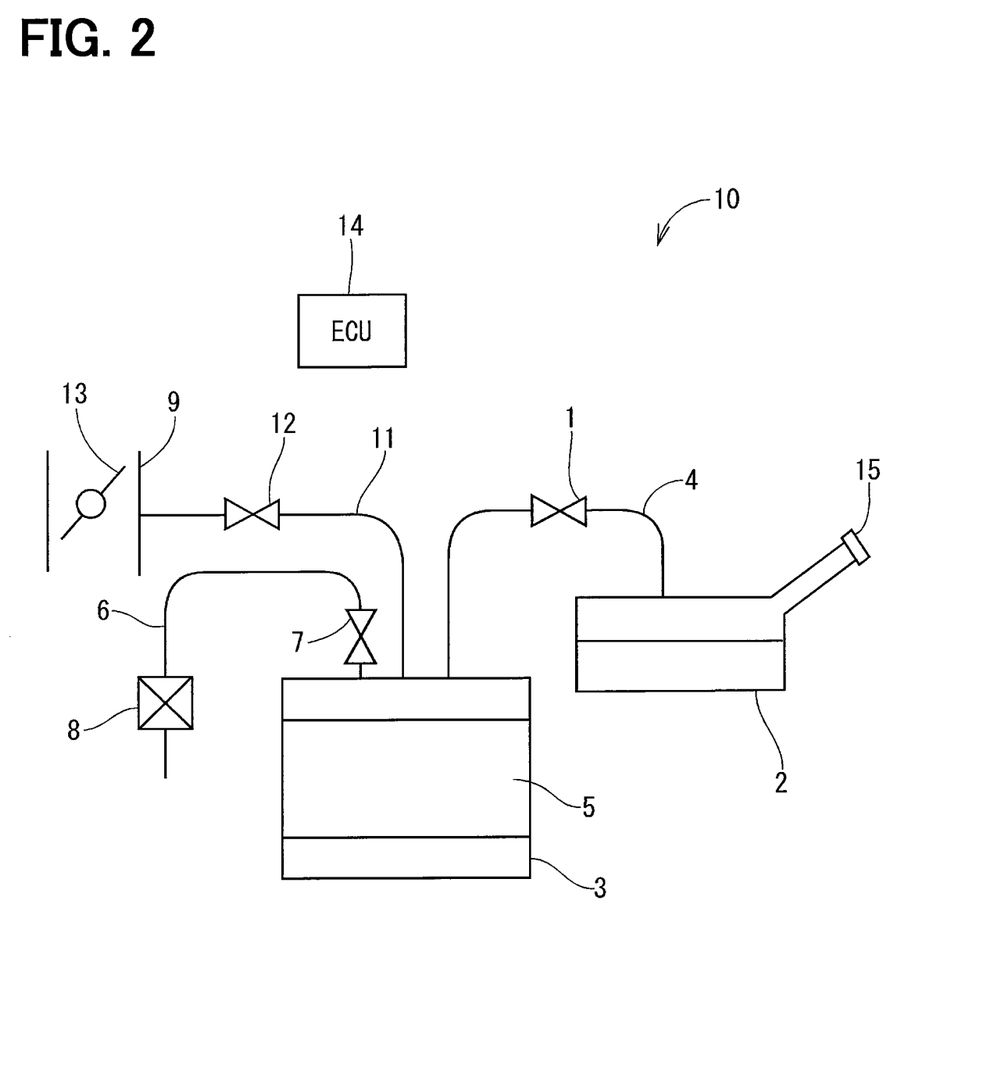
FIG. 2 is a schematic diagram showing a fuel tank sealing system employing the fluid control valve device according to the first embodiment of the present disclosure.

FIG. 1 shows a fluid control valve device according to a first embodiment of the present disclosure. FIG. 2 shows a fuel tank sealing system employing the fluid control valve device. A fuel tank sealing system 10 is one kind of a vapor fuel processing system. The fuel tank sealing system 10 is employed in, for example, a hybrid vehicle. For example, a hybrid vehicle is configured to select at least one of an electric motor and an internal combustion engine and to travel according to an operation state of the vehicle.

The fluid control valve device 1 is equipped to an intermediate portion of a pipe 4. The pipe 4 connects a fuel tank 2 with a canister 3. The canister 3 accommodates an adsorption material 5 to adsorb vapor fuel. A solenoid valve 7 is equipped to an intermediate portion of a pipe 6. The pipe 6 is connected with the canister 3 at one end and is opened to the atmosphere at the other end. When the solenoid valve 7 opens, the canister 3 is opened to the atmosphere through the pipe 6. A filter 8 is equipped to the pipe 6 on the atmosphere side relative to the solenoid valve 7.

A purge valve 12 is equipped to an intermediate portion of a pipe 11. The pipe 11 connects the canister 3 with an intake pipe 9. When the purge valve 12 and the solenoid valve 7 are opened, vapor fuel, which is absorbed in the canister 3, is applied with a negative pressure, which occurs at downstream of a throttle valve 13, and discharged (purged) into the intake pipe 9.

It is noted that, when the vehicle travels with the electric motor, negative pressure does not occur in the intake pipe 9. Therefore, vapor fuel, which is absorbed by the canister 3, cannot be discharged into the intake pipe 9. In this case, the adsorption material 5 of the canister 3 may adsorb vapor fuel excessively. Consequently, the absorbed vapor fuel may overflow from the adsorption material 5. In consideration of the case, the fuel tank sealing system 10 includes the fluid control valve device 1 equipped between the fuel tank 2 and the canister 3. The fluid control valve device 1 is configured to close to seal the fuel tank 2 in order to avoid overflow.

When a driver refuels the fuel tank 2, the driver may manipulate a fuel lid opening lever (not shown). In the fuel tank sealing system 10, when the driver manipulates the fuel lid opening lever, an electronic control unit (ECU) 14 receives an open signal from, for example, an open switch equipped to the fuel lid opening lever. Thus, the ECU 14 opens the fluid control valve device 1 in response to the open signal. Consequently, the fuel tank 2 communicates with the canister 3. Therefore, pressure in the fuel tank 2 decreases to the atmospheric pressure. The present configuration restricts emission of vapor fuel from the fuel tank 2 through a fueling port to the atmosphere when a cap 15 of the fueling port is opened.

As shown in FIG. 1, the fluid control valve device 1 includes a first housing 20, a second housing 30, a first valve element 40, an actuator 50, a second valve element 60, a spring 70, outer peripheral passages 81, and the like. The spring 70 may function as a biasing member. The first housing 20 includes a main body 21 and an inflow pipe portion 22. The main body 21 and the inflow pipe portion 22 may be integrally formed of, for example resin. The main body 21 is substantially in a cylindrical shape. The main body 21 internally defines a first fluid chamber 24. The main body 21 has an inflow hole 23. The inflow hole 23 connects an outer wall of the main body 21 with an inner wall of the main body 21. The inflow hole 23 is connected to the first fluid chamber 24.

The inflow pipe portion 22 is substantially in a cylindrical shape. The inflow pipe portion 22 is integrally formed with the main body 21, such that an interior of the inflow pipe portion 22 is connected with the inflow hole 23. The inflow pipe portion 22 is connected to the pipe 4 on the side of the fuel tank 2. In the present configuration, vapor fuel in the fuel tank 2 is enabled to flow through the pipe 4, the inflow pipe portion 22, and the inflow hole 23 and to flow into the first fluid chamber 24.

The main body 21 has a first hole 25. The first hole 25 connects an outer wall of the main body 21 with an inner wall of the main body 21. The first hole 25 is connected to the first fluid chamber 24. The main body 21 has a first valve seat portion 26. The first valve seat portion 26 is formed on an outer circumferential periphery of the first hole 25. The first valve seat portion 26 is substantially in an annular shape.

The second housing 30 includes a main body 31 and an outflow pipe portion 32. The main body 31 and the outflow pipe portion 32 may be separately formed of, for example resin. The main body 31 is substantially in a cylindrical shape. The main body 31 is integrally formed with the main body 21, such that the main body 31 is substantially coaxial with the main body 21 of the first housing 20. The main body 31 internally defines a second fluid chamber 34. The main body 31 has a second hole 33. The second hole 33 connects the first hole 25 of the first housing 20 with the second fluid chamber 34. In the present configuration, fluid in the first fluid chamber 24 of the first housing 20 is enabled to flow through the first hole 25 and the second hole 33 and to flow into the second fluid chamber 34.

The outflow pipe portion 32 is substantially in a cylindrical shape. The outflow pipe portion 32 is connected to the main body 31 and is substantially coaxial with the main body 31. An interior of the outflow pipe portion 32 is connected with the second fluid chamber 34. An outflow hole 35 is formed at an end of the outflow pipe portion 32 on the side of the main body 31. The outflow hole 35 is connected to the second fluid chamber 34. The outflow pipe portion 32 is connected to the pipe 4 on the side of the canister 3. In the present configuration, fluid in the second fluid chamber 34 is enabled to flow through the outflow hole 35, the outflow pipe portion 32, and the pipe 4 and to flow into the canister 3.

Figure 3A:
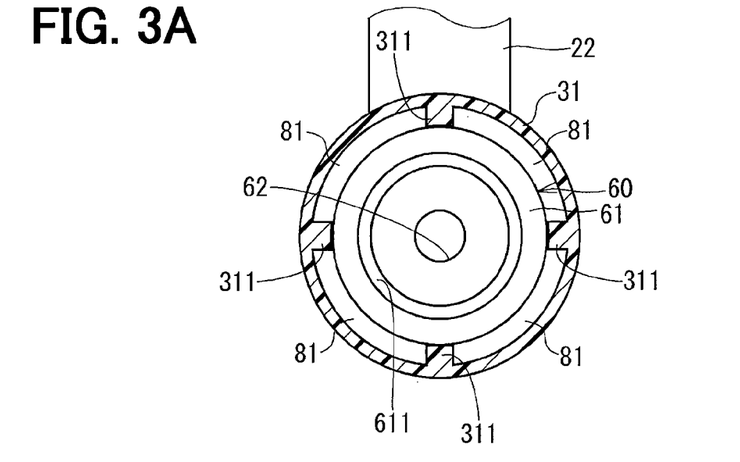
FIG. 3A is a sectional view taken along a line IIIA-IIIA in FIG. 1.
Figure 3B:
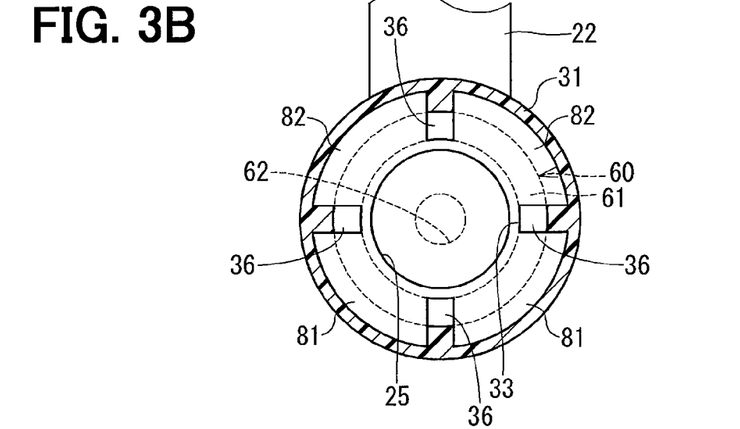
FIG. 3B is a sectional view taken along a line IIIB-IIIB in FIG. 1.
Figure 3C:
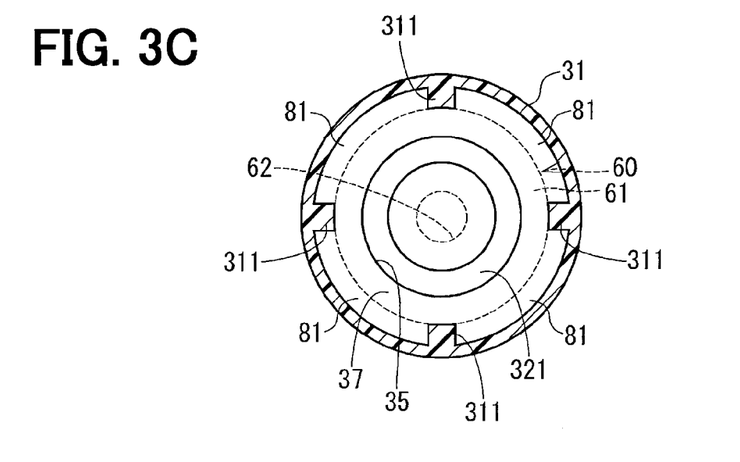
FIG. 3C is a sectional view taken along a line IIIC-IIIC in FIG. 1.

As shown in FIG. 3B, the main body 31 has a second valve seat portion 36. The second valve seat portion 36 is formed on an outer circumferential periphery of the second hole 33. As shown in FIG. 3C, the main body 31 has a third valve seat portion 37. The third valve seat portion 37 is formed on an outer circumferential periphery of the outflow hole 35. The third valve seat portion 37 is substantially in an annular shape.

The first valve element 40 includes a main body 41 and a contact portion 42. The main body 41 is substantially in a tubular shape and is formed of, for example, resin. The contact portion 42 is substantially in an annular shape and is formed of, for example, an elastic material such as rubber. The contact portion 42 is equipped to an outer circumferential periphery of an end surface of one end of the main body 41. The first valve element 40 is equipped in the main body 21 of the first housing 20, such that the main body 41 is movable back and forth in the first fluid chamber 24 along an axis of the main body 21. The first valve element 40 is configured to make contact with the first valve seat portion 26 at the contact portion 42. The contact portion 42 is formed of, for example, an elastic material such as rubber. Therefore, the contact portion 42 is configured to be in contact tightly with the first valve seat portion 26.

When the first valve element 40 is in contact with the first valve seat portion 26 and is seated on the first valve seat portion 26, the first valve element 40 blocks flow of fluid between the first fluid chamber 24 on the side of the inflow hole 23 and the first fluid chamber 24 on the side of the first hole 25. When the first valve element 40 moves away from the first valve seat portion 26 and is lifted from the first valve seat portion 26, the first valve element 40 allows flow of fluid between the first fluid chamber 24 on the side of the inflow hole 23 and the first fluid chamber 24 on the side of the first hole 25. When the first valve element 40 moves from the first valve seat portion 26, the first valve element 40 moves in an opening direction. When the first valve element 40 makes contact with the first valve seat portion 26, the first valve element 40 moves in a closing direction.

The actuator 50 is equipped on the opposite side of the main body 21 of the first housing 20 from the second housing 30. The actuator 50 includes a housing 51, a stationary core 52, a moving core 53, a spring 54, a coil 55, a yoke 56, a terminal 57, and the like.

The housing 51 is in a bottomed tubular shape having an opening. The housing 51 is formed of, for example, resin. The housing 51 is joined with the first housing 20, such that the housing 51 covers, at the side of the opening, an opening of the main body 21 on the opposite side of the second housing 30. The stationary core 52 is substantially in a tubular shape and is formed of, for example, a metallic material such as a ferrous material. The stationary core 52 is accommodated in the housing 51, such that the stationary core 52 is fixed to a bottom portion of the housing 51 at one end and is coaxial with the main body 21.

The moving core 53 is substantially in a tubular shape and is formed of, for example, a metallic material such as a ferrous material. The moving core 53 is accommodated in the stationary core 52, such that the moving core 53 is movable back and forth in the axial direction. The moving core 53 is connected with, at one end, an end of the first valve element 40 on the opposite side of the contact portion 42. With the present configuration, the moving core 53 and the first valve element 40 are movable integrally back and forth in the axial direction.

The spring 54 is a coil spring. The spring 54 is equipped between the stationary core 52 and the moving core 53, such that one end and of the spring 54 is located on the side of the stationary core 52, and the other end of the spring 54 is located on the side of the moving core 53. The spring 54 has a resiliency in the axial direction. Therefore, the spring 54 biases the moving core 53 and the first valve element 40 in the closing direction.

The coil 55 is substantially in a tubular shape. The coil 55 is accommodated in the housing 51, such that the coil 55 is located on the radially outside of the stationary core 52 and the moving core 53. The yoke 56 is formed of, for example, a metallic material such as a ferrous material. The yoke 56 surrounds the coil 55. The yoke 56 is accommodated in the housing 51, such that the yoke 56 is connected with the stationary core 52.

The terminal 57 is equipped in the housing 51, such that one end of the terminal 57 is electrically connected with the coil 55. The terminal 57 is connected with the ECU 14 and a battery (not shown). The ECU 14 controls an electric power, which is supplied from the battery through the terminal 57 to the coil 55, according to signals sent from various sensors. The sensors are equipped at various positions on the vehicle.

When the coil 55 is supplied with an electric power, the stationary core 52, the moving core 53, and the yoke 56 form a magnetic circuit thereamong. With the present configuration, the moving core 53 is drawn to move toward a bottom portion of the housing 51 against the biasing force of the spring 54. Consequently, the first valve element 40 moves together with the moving core 53 in the opening direction. Thus, the contact portion 42 moves away from the first valve seat portion 26. That is, the contact portion 42 is lifted from the first valve seat portion 26. To the contrary, when supply of an electric power to the coil 55 is terminated, the magnetic circuit disappears. Consequently, the moving core 53 is applied with the biasing force of the spring 54 to move toward the second housing 30. Consequently, the first valve element 40 moves together with the moving core 53 in the closing direction. Thus, the contact portion 42 makes contact with the first valve seat portion 26. That is, the contact portion 42 is seated onto the first valve seat portion 26. The actuator 50 according to the present embodiment may function as a solenoid actuator, which is configured to be activated with an electromagnetic force in this way.

The second valve element 60 includes a main body 61. The main body 61 is substantially in a disc shape and is formed of, for example, resin. The second valve element 60 is movable back and forth between the second valve seat portion 36 and the third valve seat portion 37 in the second fluid chamber 34. The main body 61 is configured to make contact with the second valve seat portion 36 or the third valve seat portion 37 at an outer circumferential periphery. The outer diameter of the main body 61 is slightly smaller than the inner diameter of the main body 31 of the second housing 30. With the present configuration, the main body 61 is slidable relative to an inner wall of the main body 31 when moving back and forth in the second fluid chamber 34. The second valve element 60 has a hole 62, which extends through the center of the main body 61 in a thickness direction. That is, the hole 62 is formed to connect a space formed with the second valve element 60 on the side of the second hole 33 to a space formed with the second valve element 60 on the side of the outflow hole 35.

The spring 70 is a coil spring. The spring 70 is equipped between the outflow pipe portion 32 and the second valve element 60, such that one end of the spring 70 is located on the side of the outflow pipe portion 32, and the other end of the spring 70 is located on the side of the second valve element 60. More specifically, one end of the spring 70 is in contact with a step portion 321, which is formed inside the outflow hole 35 of the outflow pipe portion 32. The other end of the spring 70 is fitted to a groove portion 611, which is formed in the main body 61 of the second valve element 60. The spring 70 has a resiliency in the axial direction. Therefore, the spring 70 biases the second valve element 60 toward the second valve seat portion 36. That is, the spring 70 biases the second valve element 60 in a direction to cause the second valve element 60 to make contact with the second valve seat portion 36. With the present configuration, the spring 70 biases the main body 61 onto the second valve seat portion 36.

As shown in FIG. 3A, the outer peripheral passages 81 are dented radially inward from the inner wall of the main body 31 of the second housing 30. In the present embodiment, four outer peripheral passages 81 are formed along the circumferential direction of the main body 31. A rib 311 is formed between adjacent outer peripheral passages 81. The four outer peripheral passages 81 form the four ribs 311 therebetween. The outer peripheral passages 81 are formed between the outer circumferential periphery of the main body 61 of the second valve element 60 and the main body 31 of the second housing 30. The present configuration enables fluid to flow between the space formed with the second valve element 60 on the side of the second hole 33 and the space formed with the second valve element 60 on the side of the outflow hole 35. The present configuration enables fluid to flow from the space formed with the second valve element 60 on the side of the second hole 33 through the outer peripheral passages 81 into the space formed with the second valve element 60 on the side of the outflow hole 35.

The fluid control valve device 1 according to the present embodiment further has second valve seat passages 82. As shown in FIG. 1 and FIG. 3B, the second valve seat passages 82 are formed in the vicinity of the second valve seat portion 36. In a state where the second valve element 60 is in contact with the second valve seat portion 36, fluid is enabled to flow between the space formed with the second valve element 60 on the side of the second hole 33 and the space formed with the second valve element 60 on the side of the outflow hole 35. More specifically, the second valve seat passages 82 are formed in the vicinity of the second valve seat portion 36. The second valve seat passages 82 are located on the radially outside of the second hole 33. In the present configuration, the second valve seat passages 82 are connected (communicated) with the outer peripheral passages 81. Even in the state where the second valve element 60 is in contact with the second valve seat portion 36, the present configuration enables fluid to flow from the space formed with the second valve element 60 on the side of the second hole 33 through the second valve seat passage 82 into the outer peripheral passages 81, that is, into the outflow hole 35.

Subsequently, an example of operation of the fluid control valve device 1 according to the present embodiment will be described with reference to FIGS. 1 and 4 to 6. As shown in FIG. 1, when an electric power is not supplied to the coil 55, the first valve element 40 is biased from the spring 54 and is in contact with the first valve seat portion 26. In addition, the second valve element 60 is biased from the spring 70 and is in contact with the second valve seat portion 36. Therefore, fluid flow from the inflow pipe portion 22 into the outflow pipe portion 32 is blocked.

Figure 4:
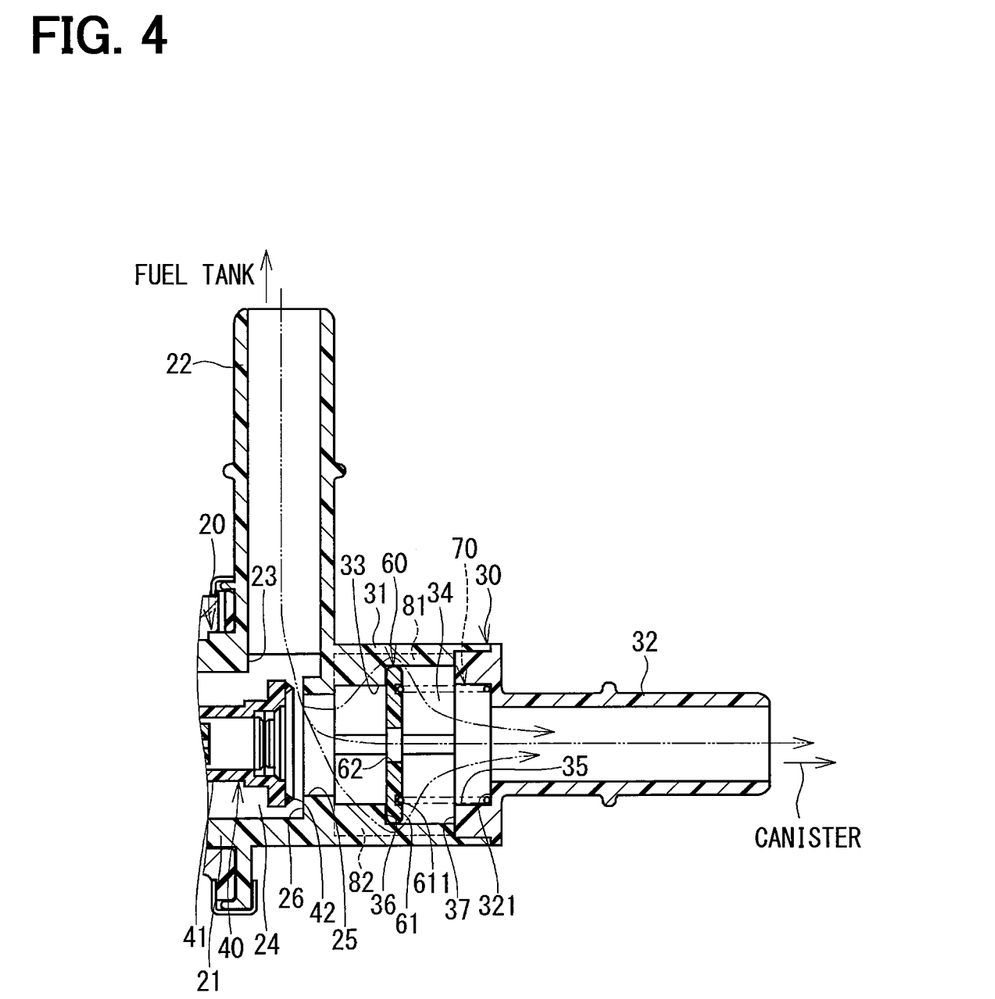
FIG. 4 is a sectional view showing a portion around the second valve element and showing a first operation of the fluid control valve device according to the first embodiment of the present disclosure.

As shown in FIG. 4, when the ECU 14 instructs to supply an electric power to the coil 55, the first valve element 40 moves in the opening direction against the biasing force of the spring 54. In this way, the first valve element 40 moves away from the first valve seat portion 26. That is, the first valve element 40 is lifted from the first valve seat portion 26 to implement valve opening. Thus, fluid in the inflow pipe portion 22 flows through a passage between the first valve seat portion 26 and the contact portion 42 of the first valve element 40. The fluid further flows through the first hole 25, the second hole 33, the second fluid chamber 34, and the outflow hole 35. Thus, the fluid flows into the outflow pipe portion 32. In the present state, as shown by two-point chain lines in FIG. 4, fluid flows from the first hole 25 through the hole 62, the second valve seat passages 82, and the outer peripheral passages 81. Thus, the fluid flows into the outflow pipe portion 32.

FIG. 4 shows a state where a differential pressure between the fuel tank 2 and the canister 3 is relatively small. That is, FIG. 4 shows a state where the differential pressure between the fuel tank 2 and the canister 3 is below the biasing force of the spring 70. In the present state, fluid flows through the hole 62, the second valve seat passages 82, and the outer peripheral passages 81. Therefore, a large quantity of fluid flows through the fluid control valve device 1. That is, in the present state, a quantity of fluid becomes large.

Figure 5:
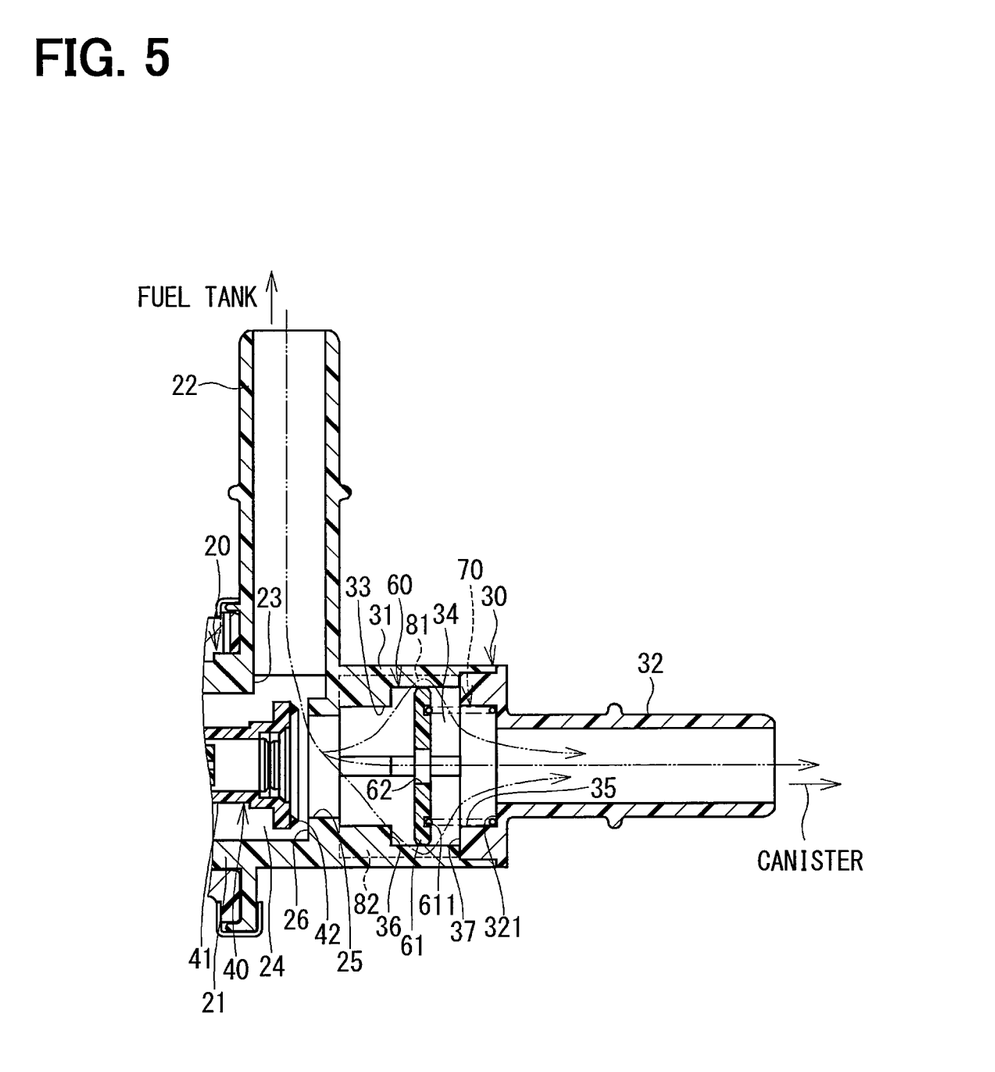
FIG. 5 is a sectional view showing a portion around the second valve element and showing a second operation of the fluid control valve device according to the first embodiment of the present disclosure.

FIG. 5 shows a state where the ECU 14 instructs to supply an electric power to the coil 55 and to open the first valve element 40. In addition, the differential pressure between the fuel tank 2 and the canister 3 is greater than the biasing force of the spring 70. In the present state, the second valve element 60 moves away from the second valve seat portion 36. In the present state, as shown by two-point chain lines in FIG. 5, fluid flows from the first hole 25 through the hole 62 and the outer peripheral passages 81. Thus, the fluid flows into the outflow pipe portion 32. In the present state, a large quantity of fluid flows through the fluid control valve device 1 similarly to the state shown in FIG. 4. That is, in the present state, a quantity of fluid becomes large.

Figure 6:
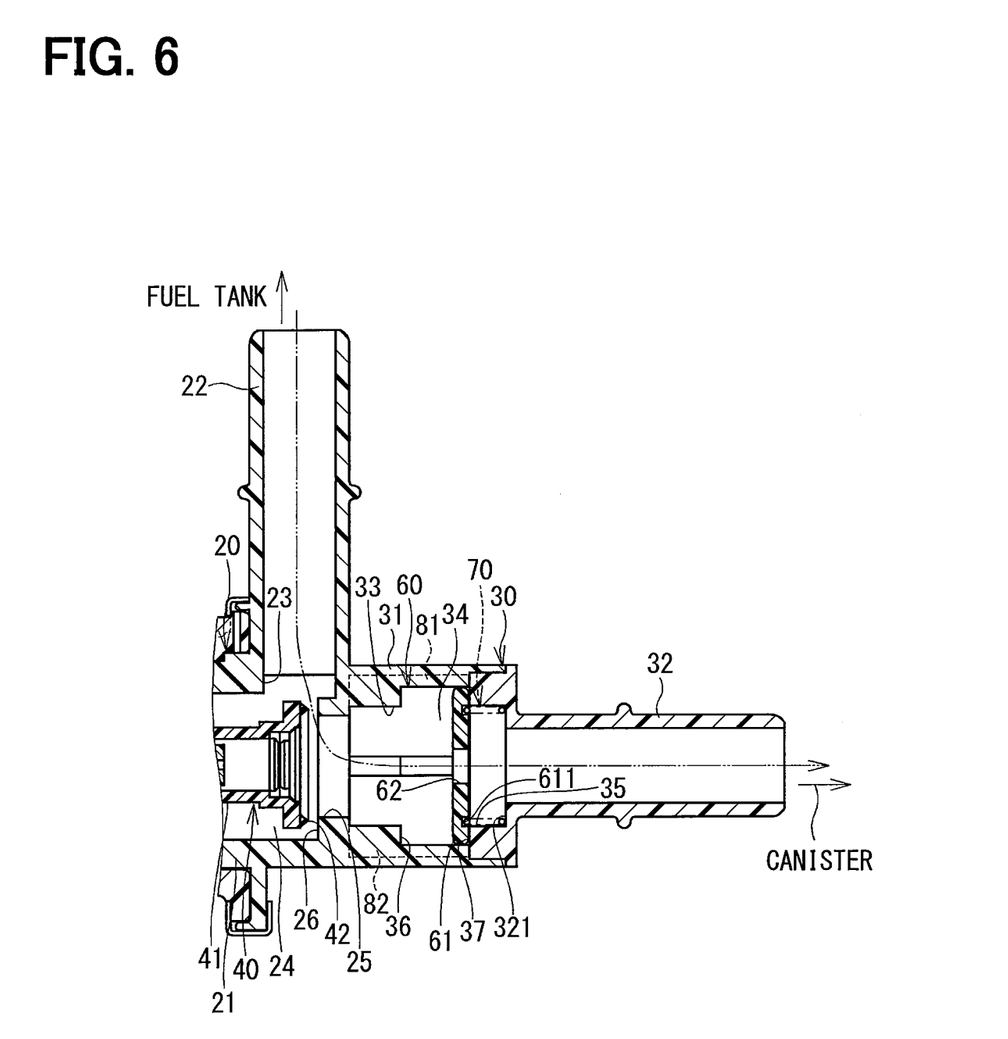
FIG. 6 is a sectional view showing a portion around the second valve element and showing a third operation of the fluid control valve device according to the first embodiment of the present disclosure.

FIG. 6 shows a state where the ECU 14 instructs to supply an electric power to the coil 55 and to open the first valve element 40. In addition, the differential pressure between the fuel tank 2 and the canister 3 becomes further greater than the biasing force of the spring 70. In the present state, the second valve element 60 makes contact with the third valve seat portion 37. In the present state, as shown by two-point chain lines in FIG. 6, fluid flows from the first hole 25 through the hole 62, without passing through the outer peripheral passages 81. The fluid flows into the outflow pipe portion 32. In the present state, a smaller quantity of fluid flows through the fluid control valve device 1 compared with the states shown in FIGS. 4 and 5. That is, in the present state, a quantity of fluid becomes small.

As described above, according to the present embodiment, the first valve element 40 and the second valve element 60 are located individually in the first fluid chamber 24 and the second fluid chamber 34, respectively. The biasing force of the spring 70 is applied selectively to (or only to) the second valve element 60. Therefore, even in a case where the biasing force of the spring 70 is modified to adjust an operation pressure of the second valve element 60, the modification may not have an affect on a driving force for the first valve element 40. More specifically, even in a case where the differential pressure between the side of the inflow hole 23 and the side of the outflow hole 35 when the second valve element 60 moves away from the second valve seat portion 36 is modified, the modification may not exert an effect on the driving force for the first valve element 40. Even in a case where the differential pressure between the side of the inflow hole 23 and the side of the outflow hole 35 when the second valve element 60 makes contact with the third valve seat portion 37 is modified, the modification may not exert an effect on the driving force for the first valve element 40. Therefore, even in a case where the operation pressure of the second valve element 60 is modified, the design of the actuator 50 need not be modified. Thus, design variation can be made easily.

According to the present embodiment, the actuator 50 is a solenoid actuator, which is operated with an electromagnetic force. Therefore, even in a case where the operation pressure of the second valve element 60 is modified, modification of the biasing force of the spring 54, modification of the number of turns of the coil 55, and/or modification of an electric power supplied to the coil 55 is not needed.

In addition, according to the present embodiment, the fluid control valve device 1 is employed, such that the inflow hole 23 (inflow pipe portion 22) is connected to the fuel tank 2. Therefore, the first valve element 40 isolates the second valve element 60 from vapor fuel on the side of the fuel tank 2. Thus, the second valve element 60 can be protected from various kinds of influences, due to exposure to fuel, such as adhesion of adhesive substance, extraction, swelling, and/or deterioration. The present configuration restricts adhesion of adhesive substance to the second valve element 60, thereby to restrict the second valve element 60 from sticking onto the second valve seat portion 36. Thus, the present configuration avoids occurrence of malfunction. It is noted that, the second valve seat portion 36 or the third valve seat portion 37 may cause noise when the second valve element 60 makes contact with the second valve seat portion 36 or the third valve seat portion 37. In addition, the second valve seat portion 36 or the third valve seat portion 37 may cause noise when the second valve element 60 moves away from the second valve seat portion 36 or the third valve seat portion 37. As described above, the first valve element 40 isolates the second valve element 60 from the fuel tank 2. Therefore, the isolation may restrict transmission of the noise caused by the second valve element 60 to the fuel tank 2. In addition, the isolation may further restrict resonance in the fuel tank 2 resulted from the transmission of noise. In addition, according to the present embodiment, a quantity of fluid flowing through the fluid control valve device 1 can be modified according to a magnitude of the differential pressure between the side of the inflow hole 23 and the side of the outflow hole 35 caused when the first valve element 40 is lifted and opened.

In addition, according to the present embodiment, the second valve seat passages 82 are formed in the vicinity of the second valve seat portion 36. In the state where the second valve element 60 is in contact with the second valve seat portion 36, fluid is enabled to flow between the space formed with the second valve element 60 on the side of the second hole 33 and the space formed with the second valve element 60 on the side of the outflow hole 35. The present configuration enables to increase a quantity of fluid, which flows through the fluid control valve device 1, even in a state where the differential pressure between the side of the inflow hole 23 and the side of the outflow hole 35 is small and in a state where the second valve element 60 is in contact with the second valve seat portion 36.

In addition, according to the present embodiment, the hole 62 is formed to connect (or communicate) the space formed with the second valve element 60 on the side of the second hole 33 to the space formed with the second valve element 60 on the side of the outflow hole 35. The present configuration enables to secure a quantity of fluid, which flows through the fluid control valve device 1, more than a predetermined quantity, regardless of a magnitude of the differential pressure between the side of the inflow hole 23 and the side of the outflow hole 35.

Second Embodiment

Figure 7:
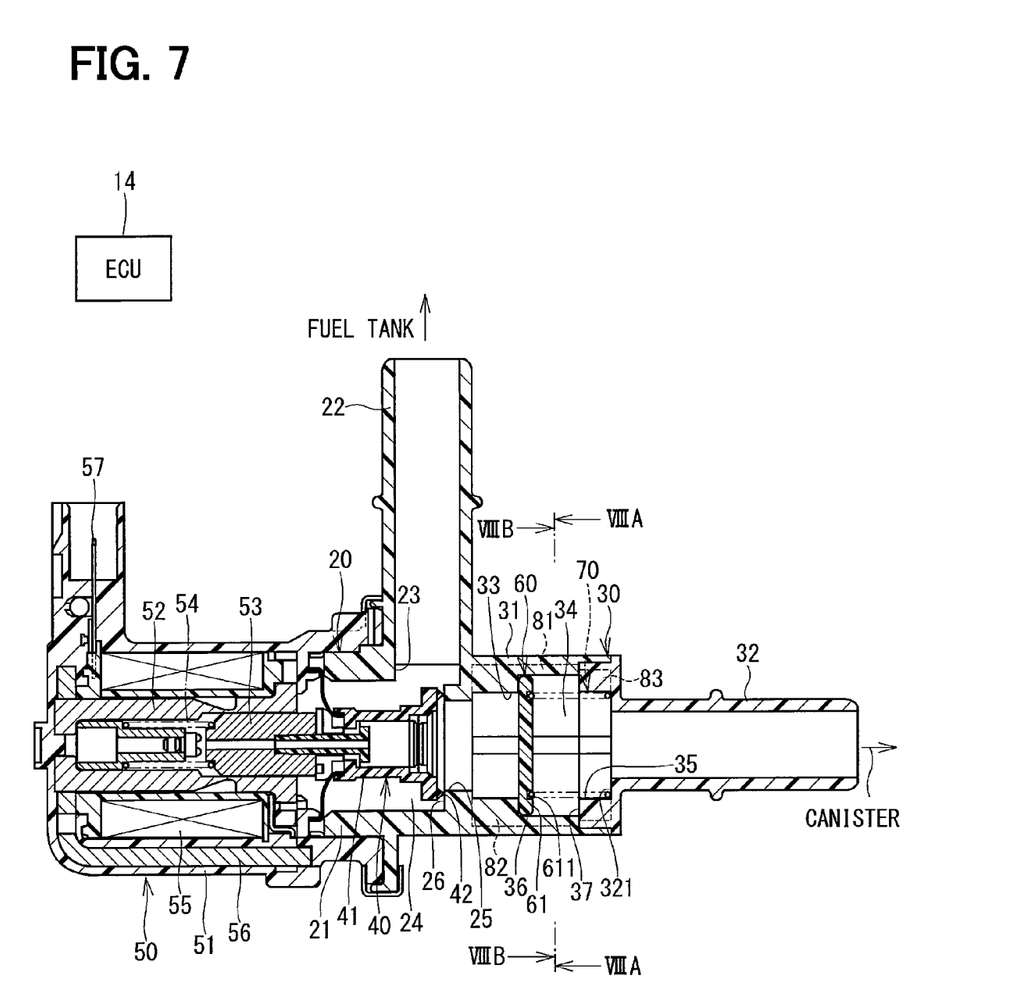
FIG. 7 is a sectional view showing a fluid control valve device according to a second embodiment of the present disclosure.

FIG. 7 shows a fluid control valve device according to a second embodiment of the present disclosure. The second embodiment is different from the first embodiment in the shapes of the second housing, the second valve element, and/or the like.

Figure 8A:
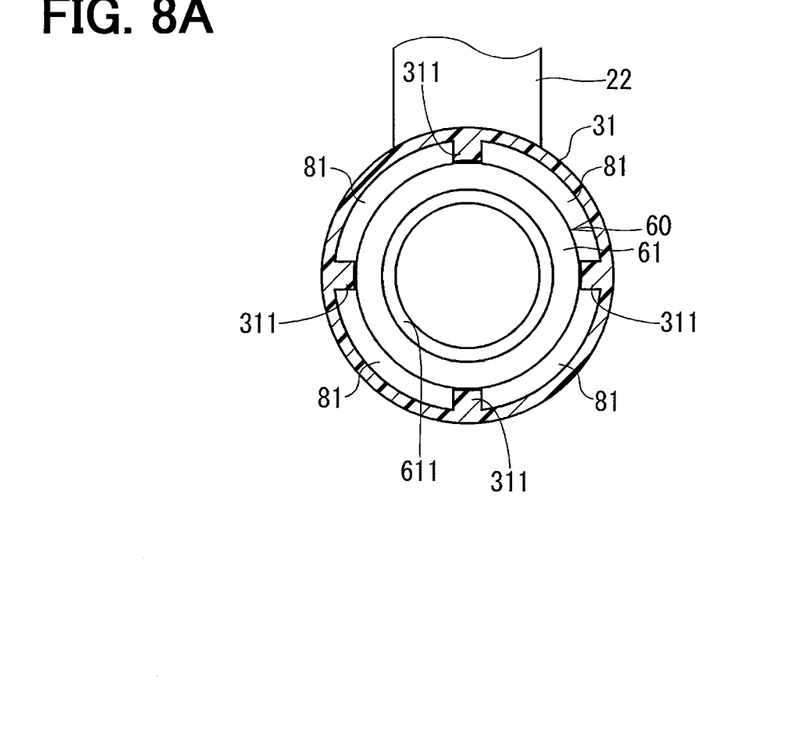
FIG. 8A is a sectional view taken along a line VIIIA-VIIIA in FIG. 7.
Figure 8B:
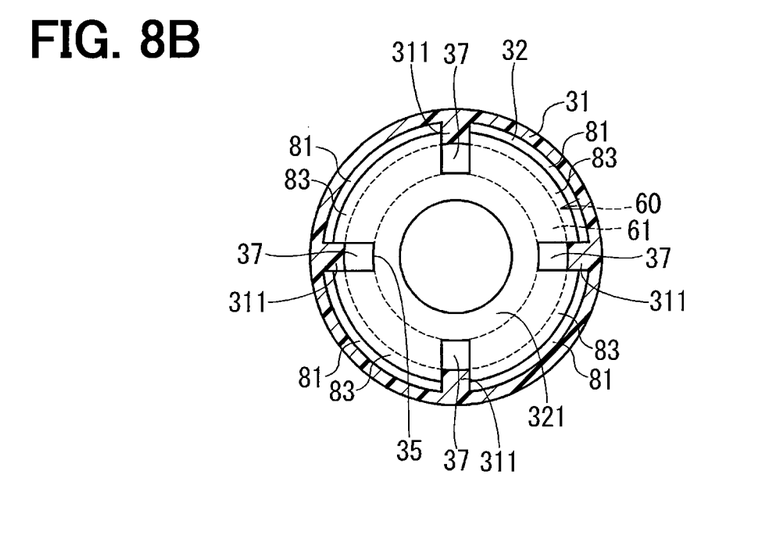
FIG. 8B is a sectional view taken along a line VIIIB-VIIIB in FIG. 7.

As shown in FIG. 7 and FIG. 8B, a fluid control valve device according to the second embodiment further includes third valve seat passages 83. The third valve seat passages 83 are formed in the outflow pipe portion 32 of the second housing 30. The third valve seat passages 83 are formed in the vicinity of the third valve seat portion 37. The third valve seat passages 83 enables fluid to flow between the space formed with the second valve element 60 on the side of the second hole 33 with the space formed with the second valve element 60 on the side of the outflow hole 35, in the state where the second valve element 60 is in contact with the third valve seat portion 37. More specifically, the third valve seat passages 83 are formed in the vicinity of the third valve seat portion 37, such that the third valve seat passages 83 are connected (or communicated) with the outer peripheral passages 81 on the radially outside of the outflow hole 35. The present configuration enables fluid to flow from the space formed with the second valve element 60 on the side of the second hole 33 through the third valve seat passages 83, even in the state where the second valve element 60 is in contact with the third valve seat portion 37. That is, the present configuration enables fluid to flow the outer peripheral passages 81 toward the outflow hole 35, even in the state where the second valve element 60 is in contact with the third valve seat portion 37. It is noted that, the passage area of the third valve seat passages 83, when the second valve element 60 is in contact with the third valve seat portion 37, is set to be smaller than the passage area of the outer peripheral passages 81 when the second valve element 60 is located between the second valve seat portion 36 and the third valve seat portion 37. According to the present embodiment, the second valve element 60 may not have the hole 62 described in the first embodiment.

Subsequently, one example of operation of the fluid control valve device according to the present embodiment will be described with reference to FIGS. 7, 9 to 11. As shown in FIG. 7, when an electric power is not supplied to the coil 55, the first valve element 40 is biased from the spring 54 and is in contact with the first valve seat portion 26. In addition, the second valve element 60 is biased from the spring 70 and is in contact with the second valve seat portion 36. Therefore, the present state blocks fluid flow from the inflow pipe portion 22 into the outflow pipe portion 32.

Figure 9:
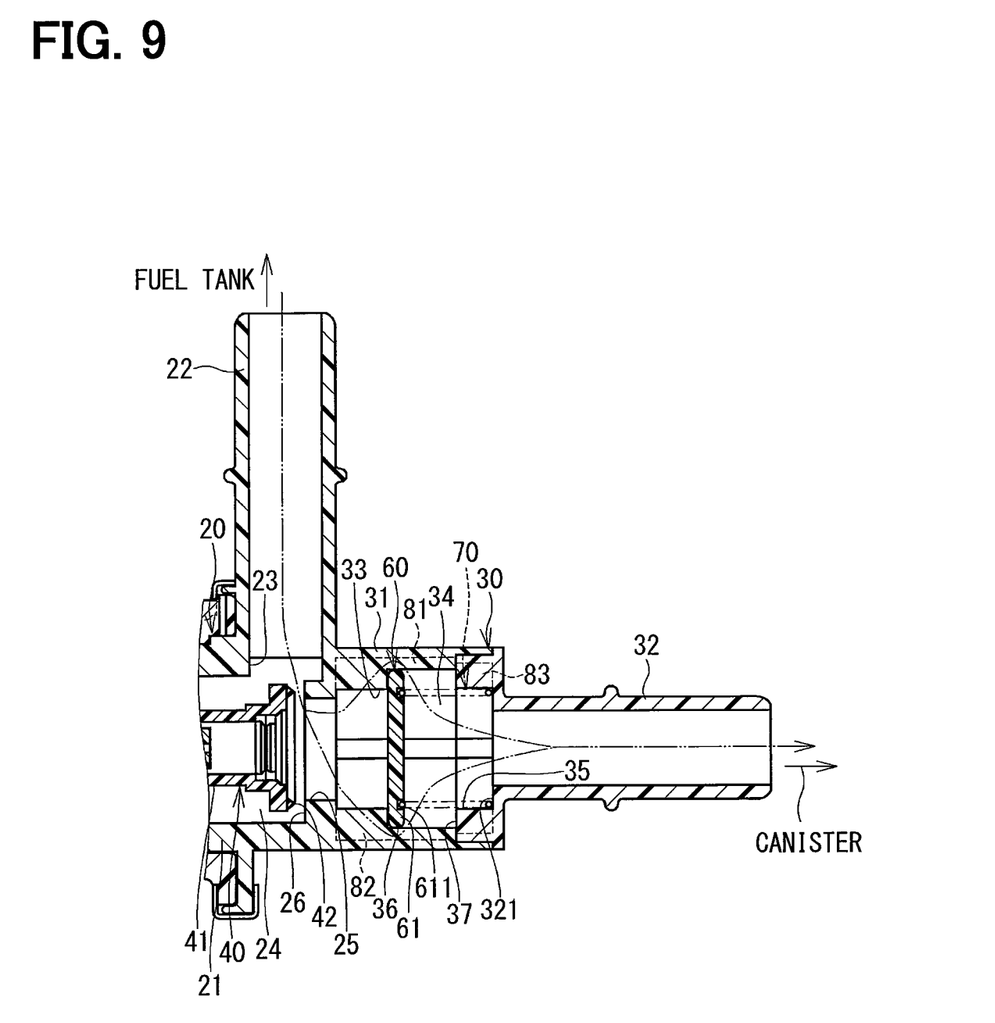
FIG. 9 is a sectional view showing a portion around the second valve element and showing a first operation of the fluid control valve device according to the second embodiment of the present disclosure.

As shown in FIG. 9, when the ECU 14 instructs to supply an electric power to the coil 55, the first valve element 40 moves in the opening direction against the biasing force of the spring 54. In this way, the first valve element 40 is moved away from the first valve seat portion 26. That is, the first valve element 40 is lifted to implement valve opening. Thus, fluid in the inflow pipe portion 22 flows through the space between the first valve seat portion 26 and the contact portion 42 of the first valve element 40. The fluid further flows through the first hole 25, the second hole 33, the second fluid chamber 34, and the outflow hole 35. Thus, the fluid further flows into the outflow pipe portion 32. In the present state, as shown by the two-point chain lines in FIG. 9, fluid flows from the first hole 25 through the second valve seat passages 82 and the outer peripheral passages 81. The fluid further flows into the outflow pipe portion 32.

It is noted that, FIG. 9 shows a state where the differential pressure between the side of the fuel tank 2 and the side of the canister 3 is relatively small. That is, FIG. 9 shows a state where the differential pressure on the side of the fuel tank 2 and the side of the canister 3 is below the biasing force of the spring 70. In the present state, fluid flows through the second valve seat passages 82 and the outer peripheral passages 81. Therefore, a large quantity of fluid flows through the fluid control valve device. That is, in the present state, a quantity of fluid becomes large.

Figure 10:
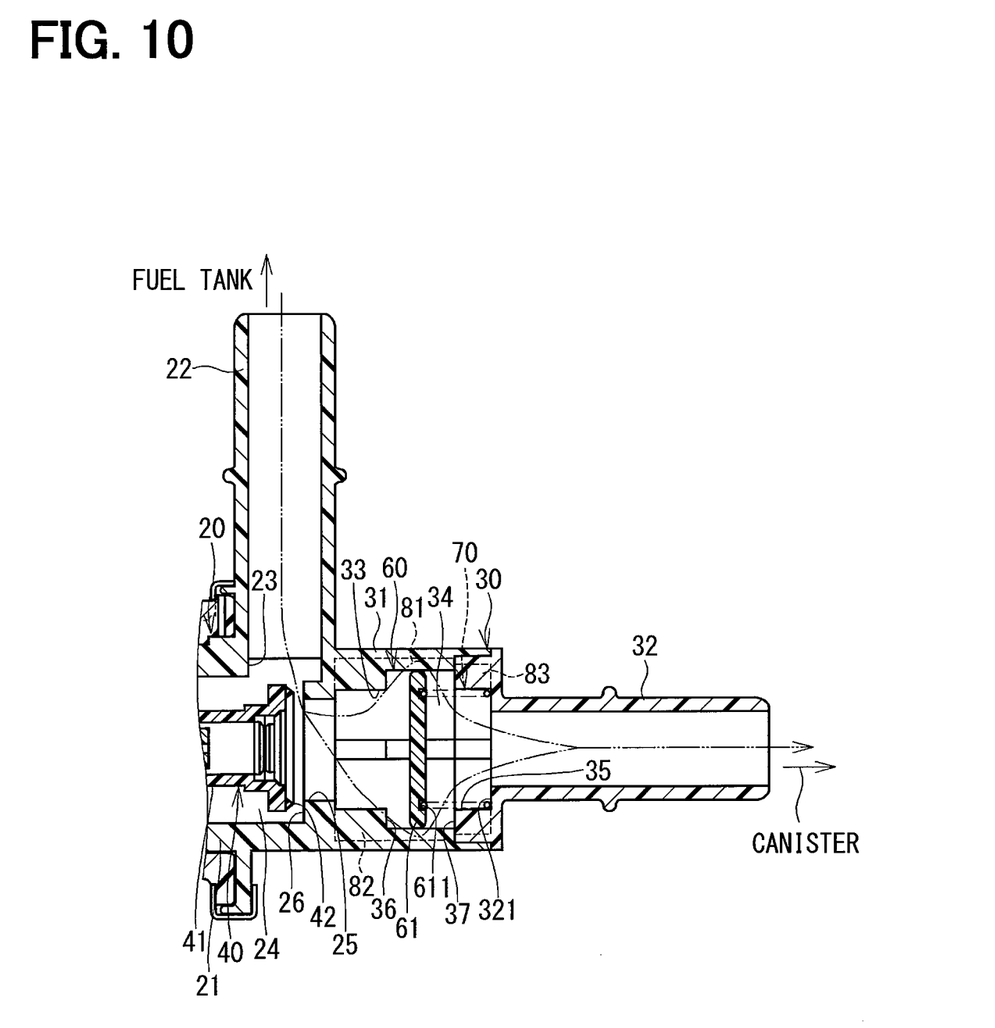
FIG. 10 is a sectional view showing a portion around the second valve element and showing a second operation of the fluid control valve device according to the second embodiment of the present disclosure.

As shown in FIG. 10, the ECU 14 instructs to supply an electric power to the coil 55 thereby to cause the first valve element 40 to implement valve opening. In addition, the differential pressure between the side of the fuel tank 2 and the side of the canister 3 is greater than the biasing force of the spring 70. In the present state, the second valve element 60 moves away from the second valve seat portion 36. In the present state, as shown by the two-point chain lines in FIG. 10, fluid flows from the first hole 25 through the outer peripheral passages 81. The fluid further flows into the outflow pipe portion 32. Therefore, similarly to the state shown in FIG. 9, a large quantity of fluid flows through the fluid control valve device. That is, in the present state, a quantity of fluid becomes large.

Figure 11:
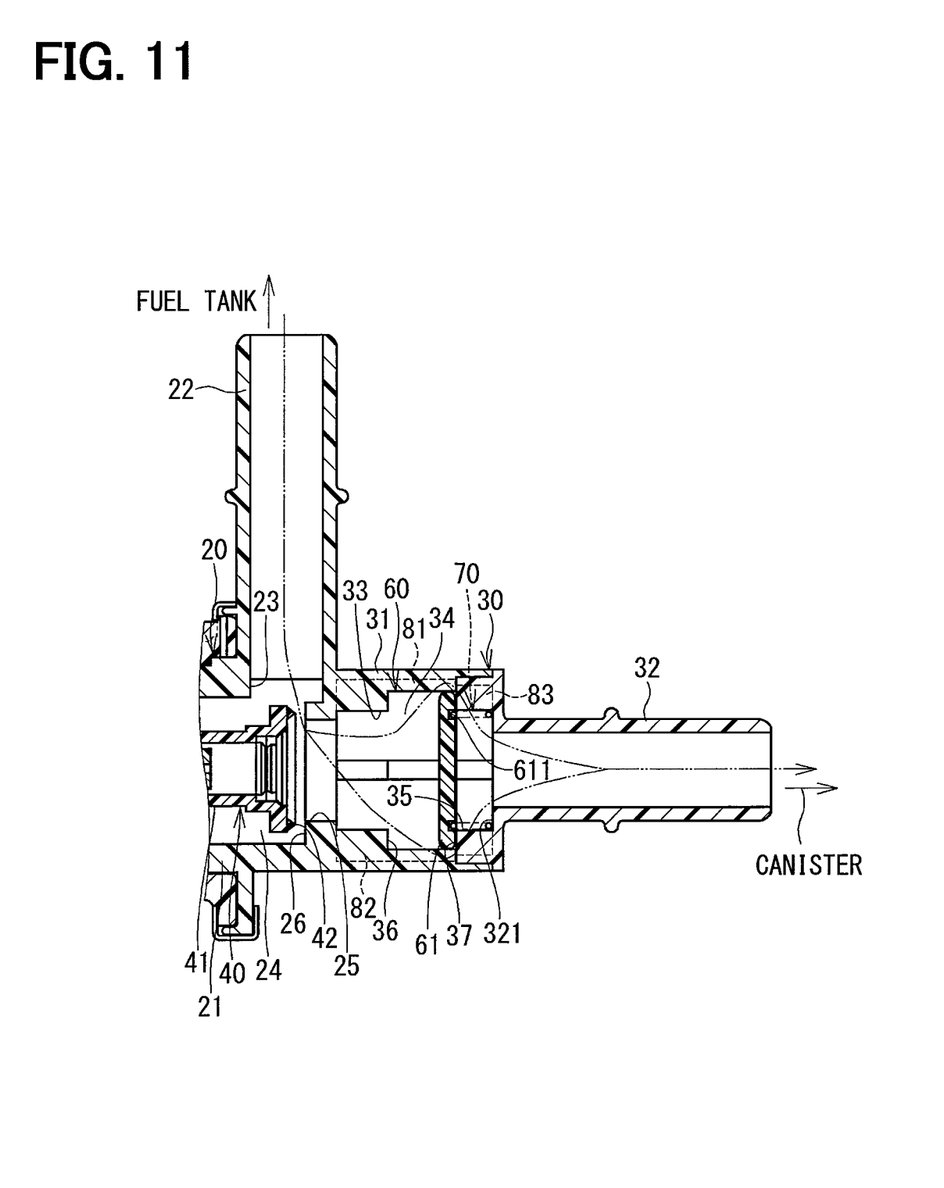
FIG. 11 is a sectional view showing a portion around the second valve element and showing a third operation of the fluid control valve device according to the second embodiment of the present disclosure.

As shown in FIG. 11, the ECU 14 instructs to supply an electric power to the coil 55 thereby to cause the first valve element 40 to implement valve opening. In addition, the differential pressure between the side of the fuel tank 2 and the side of the canister 3 is further greater than the biasing force of the spring 70. In the present state, the second valve element 60 makes contact with the third valve seat portion 37. In the present state, as shown by the two-point chain lines in FIG. 11, fluid flows from the first hole 25 through the outer peripheral passages 81 and the third valve seat passages 83. The fluid further flows into the outflow pipe portion 32. It is noted that, the passage area of the third valve seat passages 83, when the second valve element 60 is in contact with the third valve seat portion 37, is set to be smaller than the passage area of the outer peripheral passages 81 when the second valve element 60 is located between the second valve seat portion 36 and the third valve seat portion 37. Therefore, in the present state, a smaller quantity of fluid flows through the fluid control valve device compared with the states shown in FIGS. 9 and 10. That is, in the present state, a quantity of fluid becomes small.

As described above, the fluid control valve device according to the present embodiment further has the third valve seat passages 83 formed in the vicinity of the third valve seat portion 37. The present configuration enables fluid to flow between the space formed with the second valve element 60 on the side of the second hole 33 and the space formed with the second valve element 60 on the side of the outflow hole 35, in the state where the second valve element 60 is in contact with the third valve seat portion 37. In addition, according to the present embodiment, the hole 62 may not be formed in the second valve element 60, dissimilarly from the first embodiment. Even in the present configuration, similarly to the first embodiment, a quantity of fluid, which flows through the fluid control valve device, can be increased, when the differential pressure between the side of the fuel tank 2 and the side of the canister 3 is below a predetermined pressure in a low-pressure state. In addition, a quantity of fluid, which flows through the fluid control valve device, can be decreased, when the differential pressure is greater than the predetermined pressure in a high-pressure state.

Other Embodiment

At least one of the second valve seat passage, the hole, and the third valve seat passage may be omitted. A fluid control valve device according to another embodiment of the present disclosure may have at least one outer peripheral passage. Another configuration other than the first embodiment and the second embodiment may be conceivable to employ a configuration, which is equipped with the outer peripheral passage, the hole, and the third valve seat passage. Another configuration may be conceivable to employ a configuration, which is equipped with the outer peripheral passage and the second valve seat passage. Another configuration may be conceivable to employ a configuration, which is equipped with the outer peripheral passage and the hole. Another configuration may be conceivable to employ a configuration, which is equipped with the outer peripheral passage and the third valve seat passage. Another configuration may be conceivable to employ a configuration, which is equipped only with the outer peripheral passage. For example, in the configuration, which is equipped only with the outer peripheral passage, fluid is unable to flow between the space formed with the second valve element on the side of the second hole and the space formed with second valve element on the side of the outflow hole side, in the state where the second valve element is in contact with the second valve seat portion. In addition, fluid is enabled to flow between the space formed with second valve element on the side of the second hole and the space formed with second valve element on the side of the outflow hole side through the outer peripheral passage, in the state where the second valve element is lifted from the second valve seat portion and is located between the second valve seat portion and the third valve seat portion.

The above embodiments employ the configuration having the four outer peripheral passages, the four second valve seat passages, and/or the four third valve seat passages. It is noted that, the number of the outer peripheral passage(s), the number of the second valve seat passage(s), and/or the number of the third valve seat passage(s) may be arbitrarily determined.

The actuator is not limited to the solenoid actuator, which causes the first valve element to move back and forth with the magnetic attractive force generated by electricity supply. The actuator may be a device configured to use a hydraulic pressure and/or an air pressure to cause the first valve element to move back and forth. The actuator configured to move the first valve element back and forth may employ an element, such as a piezoelectric element, configured to expand and contract with electricity supply. The actuator may employ a metallic device, such as a shape memory alloy and/or a bimetal configured, to deform with thermal application. The actuator may employ other various devices to actuate the first valve element. That is, the actuator may employ various driving sources, not only an electromagnetic force.

The main body of the second housing and the outflow pipe portion may be formed integrally with each other. The main body of the first housing and the main body of the second housing 30 may be formed separately from each other. At least one of the inflow pipe portion and the outflow pipe portion may be omitted.

The configuration described in the present disclosure is not limited to application to a sealing valve, which is configured to block fluid (air) containing vapor fuel flowing out of a fuel tank. The configuration described in the present disclosure may be applied to a fluid control valve device configured to control flow of various kinds of fluid.

As described above, the fluid control valve device according to the present disclosure includes the first housing, the second housing, the first valve element, the actuator, the second valve element, the biasing member, and the outer peripheral passage. The first housing has the inflow hole configured to enable fluid to inflow therethrough, the first fluid chamber connected to the inflow hole, the first hole connected to the first fluid chamber, and the first valve seat portion formed on the outer periphery of the first hole. The second housing has the second hole connected to the first hole, the second fluid chamber connected to the second hole, the outflow hole connected to the second fluid chamber and configured to enable fluid to outflow therethrough the second valve seat portion formed on the outer periphery of the second hole, and the third valve seat portion formed on the outer periphery of the outflow hole.

The first valve element is axially movable back and forth in the first fluid chamber such that the first valve element is configured to make contact with the first valve seat portion at the outer periphery. The actuator is configured to move the first valve element back and forth. The second valve element is axially movable back and forth in the second fluid chamber between the second valve seat portion and third valve seat portion, such that the second valve element is configured to make contact with the second valve seat portion or the third valve seat portion at the outer periphery. The biasing member is configured to bias the second valve element in the direction in which the second valve element makes contact with the second valve seat portion. The outer peripheral passage is formed between the outer periphery of the second valve element and second housing such that the outer peripheral passage enables fluid to flow between the space formed with the second valve element on the side of the second hole and the space formed with the second valve element on the side of the outflow hole.

According to the present disclosure, the first valve element and the second valve element are equipped individually in the first fluid chamber and the second fluid chamber, respectively. The biasing force of the biasing member works selectively (only) on the second valve element. Therefore, even in a case where the biasing force of the biasing member is modified to adjust the operation pressure of the second valve element, the modification may not exert an influence on the driving force to drive the first valve element. More specifically, the driving force may be kept substantially constant even when the differential pressure between the inflow hole and the outflow hole when the second valve element is lifted from the second valve seat portion is modified. In addition, the driving force may be kept substantially constant even when the differential pressure between the inflow hole and the outflow hole when the second valve element is seated on the second valve seat portion is modified. Therefore, even in a case where the operation pressure of the second valve element is modified, design of the actuator need not be modified. Thus, design variation can be made easily.

In addition, in application of the fluid control valve device where the inflow hole is connected to the fuel tank, the first valve element isolates the second valve element from vapor fuel on the side of the fuel tank. Therefore, the second valve element can be protected from various kinds of influences, due to exposure to fuel, such as adhesion of adhesive substance, extraction, swelling, and/or deterioration. The present configuration restricts adhesive substance from adhering onto the second valve element thereby to restrict the second valve element from sticking onto the valve seat portion. Thus, the second valve element can be protected from causing a malfunction. In addition, the first valve element isolates the second valve element from the fuel tank. The second valve seat portion and the third valve seat portion may cause a noise when the second valve element makes contact with the second valve seat portion or the third valve seat portion or when the second valve element moves away from the second valve seat portion or the third valve seat portion. Even in such a case, the present configuration restricts transmission of the noise to the fuel tank and restricts resonance caused by the noise in the fuel tank.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A fluid control valve device comprising:
    a first housing having an inflow hole configured to enable inflow of fluid, a first fluid chamber connected to the inflow hole, a first hole connected to the first fluid chamber, and a first valve seat portion formed around an outer periphery of the first hole;
    a second housing having a second hole connected to the first hole, a second fluid chamber connected to the second hole, an outflow hole connected to the second fluid chamber and configured to enable outflow of fluid, a second valve seat portion formed around an outer periphery of the second hole, and a third valve seat portion formed around an outer periphery of the outflow hole;
    a first valve element axially movable in the first fluid chamber and configured to make contact with the first valve seat portion at an outer periphery;
    an actuator configured to move the first valve element;
    a second valve element axially movable in the second fluid chamber between the second valve seat portion and the third valve seat portion, the second valve element configured to make contact with the second valve seat portion or the third valve seat portion at an outer periphery;
    a biasing member configured to bias the second valve element in a direction in which the second valve element makes contact with the second valve seat portion; and
    an outer peripheral passage formed between an outer periphery of the second valve element and the second housing to enable flow of fluid between a space formed with the second valve element on a side of the second hole and a space formed with the second valve element on a side of the outflow hole.

2. The fluid control valve device according to claim 1, further comprising:
    a second valve seat passage formed around the second valve seat portion, wherein
    the second valve seat passage is configured to enable flow of fluid between the space formed with the second valve element on the side of the second hole and the space formed with the second valve element on the side of the outflow hole in a state where the second valve element is in contact with the second valve seat portion.

3. The fluid control valve device according to claim 1, further comprising:
- a hole configured to enable flow of fluid between the space formed with the second valve element on the side of the second hole and the space formed with the second valve element on the side of the outflow hole.

4. The fluid control valve device according to claim 1, further comprising:
- a third valve seat passage formed around the third valve seat portion, wherein
- the third valve seat passage is configured to enable flow of fluid between the space formed with the second valve element on the side of the second hole and the space formed with the second valve element on the side of the outflow hole in a state where the second valve element is in contact with the third valve seat portion.

5. The fluid control valve device according to claim 1, wherein the inflow hole is connected to a fuel tank, which is configured to store fuel.

* * * * *